United States Patent
Yoshioka et al.

(10) Patent No.: US 8,804,025 B2
(45) Date of Patent: Aug. 12, 2014

(54) SIGNAL PROCESSING DEVICE AND IMAGING DEVICE

(75) Inventors: You Yoshioka, Tokyo (JP); Toshihiko Kaneshige, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 771 days.

(21) Appl. No.: 13/032,967

(22) Filed: Feb. 23, 2011

(65) Prior Publication Data

US 2011/0205390 A1 Aug. 25, 2011

(30) Foreign Application Priority Data

Feb. 23, 2010 (JP) ................................. 2010-037860

(51) Int. Cl.
*H04N 5/232* (2006.01)
*H04N 3/14* (2006.01)
*H04N 9/73* (2006.01)

(52) U.S. Cl.
USPC ......... 348/345; 348/223.1; 348/280; 348/354

(58) Field of Classification Search
USPC ........... 348/223.1, 222.1, 273, 280, 345, 349, 348/353, 354, 335, 252
See application file for complete search history.

(56) References Cited

U.S. PATENT DOCUMENTS

2007/0206875 A1* 9/2007 Ida et al. ..................... 382/242
2010/0157127 A1* 6/2010 Takayanagi et al. ...... 348/333.02
2010/0315541 A1* 12/2010 Egawa ......................... 348/294

FOREIGN PATENT DOCUMENTS

JP 2008-205569 9/2008
JP 2010-81002 4/2010
JP 2010-145693 7/2010

OTHER PUBLICATIONS

Office Action issued Mar. 5, 2013 in Japanese Application No. 2010-037860 (With English Translation).

* cited by examiner

*Primary Examiner* — Nhan T Tran
(74) *Attorney, Agent, or Firm* — Oblon, Spivak, McClelland, Maier & Neustadt, L.L.P.

(57) ABSTRACT

According to one embodiment, a signal processing device includes a high spatial frequency range component evaluation unit configured to evaluate a high spatial frequency range component of each of basic colors for each of divided regions for an image picked up by an image pickup device, the divided regions being obtained by dividing an imaging surface of the image pickup device into a plurality of regions, a subject distance estimation unit configured to estimate a subject distance for each of the divided regions on the basis of the high spatial frequency range component, a filter coefficient generating unit configured to generate a filter coefficient for each of the divided regions on the basis of the subject distance, and a filter operation unit configured to perform a filter operation on the high spatial frequency range component by use of the filter coefficient.

19 Claims, 3 Drawing Sheets

SIGNAL PROCESSING DEVICE AND IMAGING DEVICE

CROSS-REFERENCE TO RELATED APPLICATIONS

This application is based upon and claims the benefit of priority from Japanese Patent Application No. 2010-037860, filed Feb. 23, 2010; the entire contents of which are incorporated herein by reference.

FIELD

Embodiments described herein relate generally to a signal processing device and an imaging device.

BACKGROUND

In photography using a solid-state image sensing device, subjects other than a target subject are clearly photographed due to a great depth of field. In order to avoid such a problem, there has been suggested a method of blurring the subjects other than the target subject (e.g., see Jpn. Pat. Appln. KOKAI Publication No. 2008-205569). However, it cannot always be said that proper blurring has heretofore been suggested.

DETAILED DESCRIPTION

In general, according to one embodiment, there is provided a signal processing device comprising: a high spatial frequency range component evaluation unit configured to evaluate a high spatial frequency range component of each of basic colors for each of divided regions for an image picked up by an image pickup device, the divided regions being obtained by dividing an imaging surface of the image pickup device into a plurality of regions; a subject distance estimation unit configured to estimate a subject distance for each of the divided regions on the basis of the high spatial frequency range component evaluated by the high spatial frequency range component evaluation unit; a filter coefficient generating unit configured to generate a filter coefficient for each of the divided regions on the basis of the subject distance estimated by the subject distance estimation unit; and a filter operation unit configured to perform a filter operation on the high spatial frequency range component by use of the filter coefficient generated by the filter coefficient generating unit.

Hereinafter, an embodiment will be described with reference to the drawings.

Figure 1:
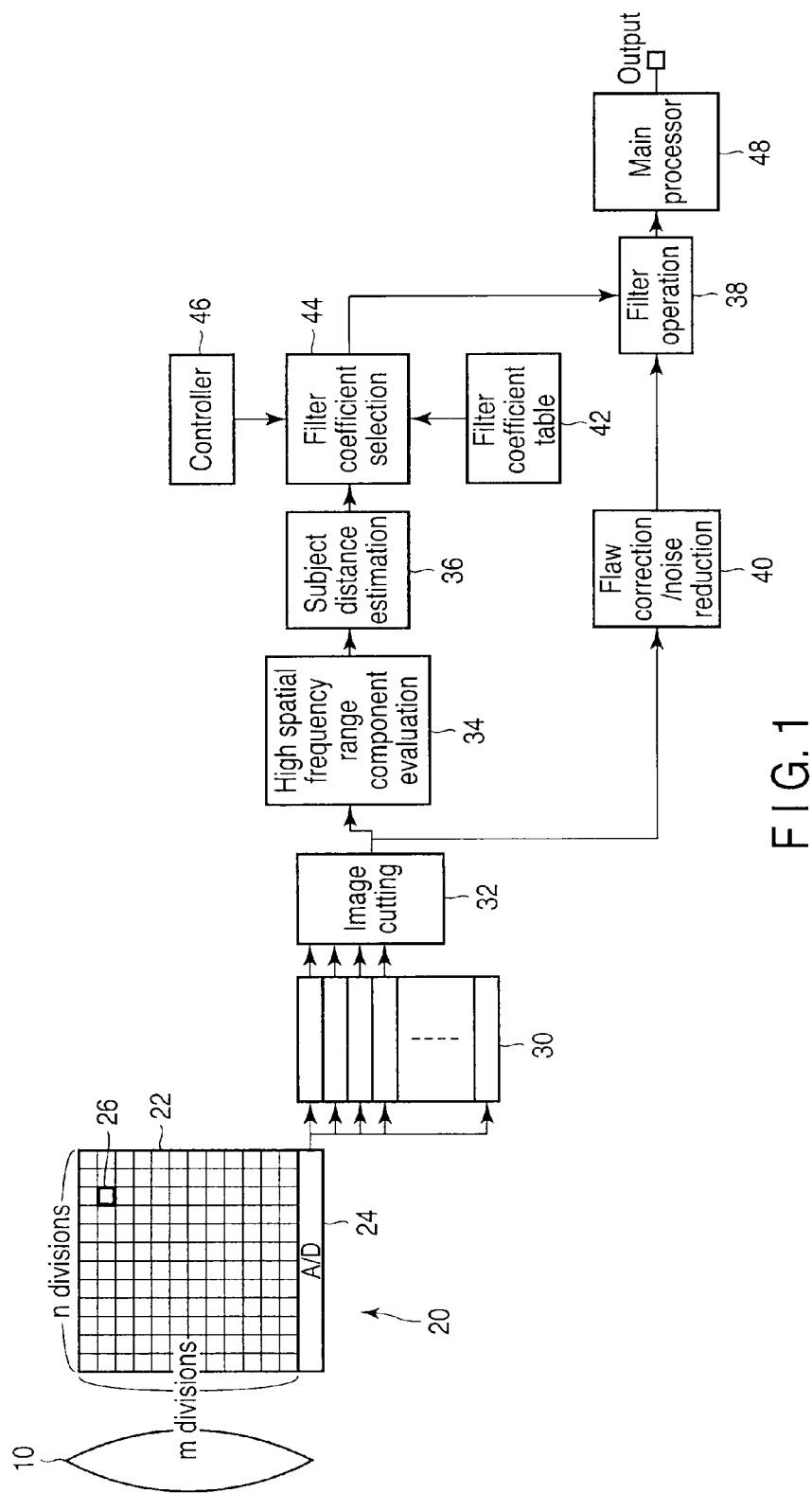
FIG. 1 is a block diagram showing the configuration of a signal processing device and an imaging device according to an embodiment.

FIG. 1 is a block diagram showing the configuration of a signal processing device and an imaging device according to the embodiment. The configurations and operations of the signal processing device and the imaging device according to the embodiment are described below with reference to FIG. 1 and others.

Figure 2:
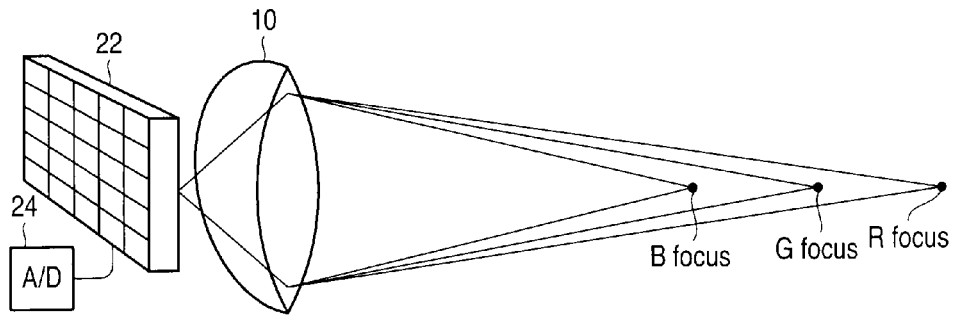
FIG. 2 is a diagram showing the color aberration of an optical system according to the embodiment.

An optical system 10 forms an image of a subject on an imaging surface of a sensor core portion 22 of an image pickup device 20. This optical system 10 comprises a high dispersion lens, and changes its focal distance in accordance with the wavelength of light. That is, as shown in FIG. 2, the optical system 10 is designed to generate color aberration, and provides different focal distances for red (R) light, green (G) light, and blue (B) light. For example, a CMOS image sensor is used for the image pickup device 20.

Figure 3:
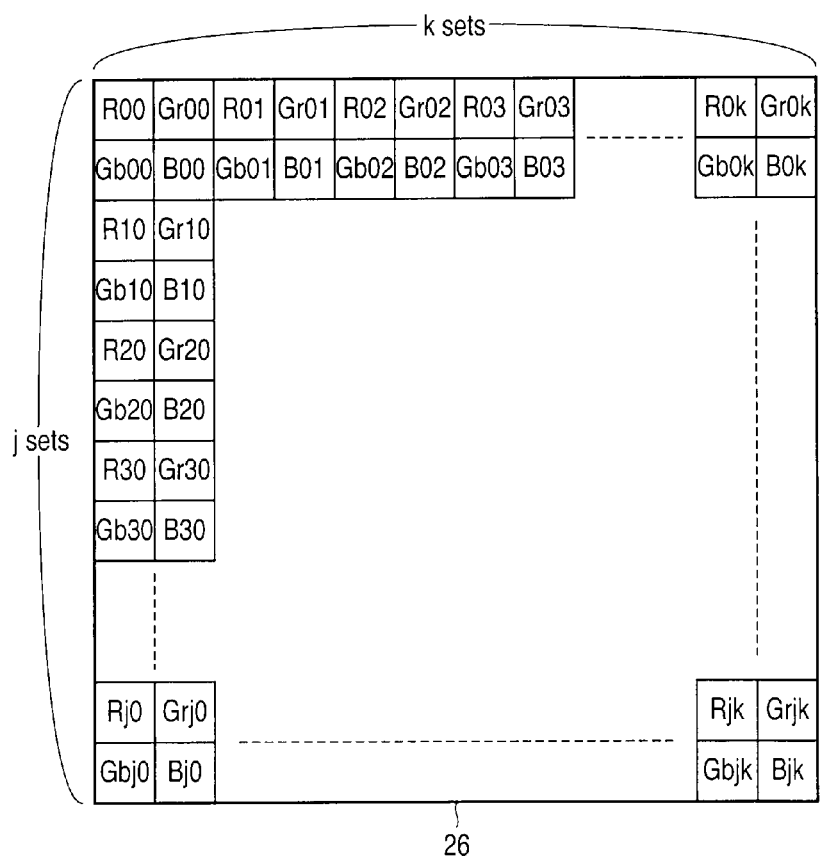
FIG. 3 is a diagram showing the configuration of a divided region according to the embodiment.

The sensor core portion 22 of the image pickup device 20 is divided by m longitudinally and by n laterally into m×n dividend regions 26. FIG. 3 is a diagram showing the configuration of the divided region 26. As shown in FIG. 3, the divided region 26 has a so-called Bayer matrix comprising longitudinal j sets and lateral k sets in which four red (R), green (Gr, Gb) and blue (B) pixels constitute one unit.

After autofocus (single AF) adjustment using the Gr pixel and the Gb pixel, the charge values of the R, Gr, Gb and B pixels are A/D-converted by an A/D converter 24 line by line.

A/D-converted data is stored in a line memory 30 line by line. Image data for the whole imaging surface (one screen) of the sensor core portion 22 is stored by the whole line memory 30.

An image cutting unit 32 has a virtual data cutting function to cut image data for a desired divided region 26 out of the mage data stored in the line memory 30. In addition, the image data may be expanded (the data may be cut) on the line memory 30.

A high spatial frequency range component evaluation unit 34 is connected to the image cutting unit 32. The high spatial frequency range component evaluation unit 34 evaluates a high spatial frequency range component of each of basic colors (R, G and B) in each of the divided regions 26 for an image picked up by the image pickup device 20. The operation of the high spatial frequency range component evaluation unit 34 is described in detail below.

First, for the R color, the image data in the pixels (R00, R01, R02, ..., R0k) for one lateral line of the divided region 26 are arranged. Further, differential sequences (R01-R00), (R02-R01), (R03-R02), ... are created. The differential sequences represent spatial derivations, and amplitude indicates lateral high frequency range power of a spatial frequency. Although a first order derivation is used in the embodiment, a higher-order function may be used. The sequences thus obtained are converted to an absolute value, integration for one lateral line is performed. As a result, a sum value of the high frequency range components for one lateral line of the divided regions 26 is obtained.

A value of a DC component is then calculated. Specifically, all the image data for the pixels (R00, R01, R02, ..., R0k) for one lateral line of the divided region 26 are integrated to calculate a DC component value.

A high frequency range evaluation value is then calculated. Specifically, a value obtained by dividing the sum value of the high frequency range components by the DC component value is calculated as a high frequency range evaluation value for one lateral line of the divided region 26 for R. As the high frequency range power varies depending on the brightness of the image, a proper high frequency range evaluation value is obtained by dividing by the DC component value. However, when the DC component value is extremely low (extremely dark), the high frequency range evaluation value may be unstable owing to noise or offset. In such a case, a threshold is set so that the high frequency range evaluation value is zero when the DC component value is lower than the threshold.

After the high frequency range evaluation value for one lateral line of the divided region 26 for R is thus calculated, a high frequency range evaluation value is calculated for the pixels (Gr00, Gr01, Gr02, . . . , Gr0$k$) for one lateral line of Gr as in the case of R. Similarly, a high frequency range evaluation value is calculated for the pixels (Gb00, Gb01, Gb02, . . . , Gb0$k$) for one lateral line of Gb, and a high frequency range evaluation value is calculated for the pixels (B00, B01, B02, . . . , B0$k$) for one lateral line of B.

After the high frequency range evaluation values for R00 to R0$k$, Gr00 to Gr0$k$, Gb00 to Gb0$k$, and B00 to B0$k$ are thus calculated, high frequency range evaluation values for R10 to R1$k$, Gr10 to Gr1$k$, Gb10 to Gb1$k$, and B10 to B1$k$ are calculated in a similar manner. Further, high frequency range evaluation values are calculated in a similar manner for all the lines up to Rj0 to Rj$k$, Grj0 to Grj$k$, Gbj0 to Gbj$k$, and Bj0 to Bj$k$.

After the lateral high frequency range evaluation value for each color (R, Gr, Gb, and B) of the divided region 26 is thus calculated as described above, longitudinal high frequency range evaluation value for each color (R, Gr, Gb, and B) of the divided region 26 is calculated in a similar manner. That is, a high frequency range evaluation value is calculated for pixels (R00, R10, R20, . . . , Rj0) for one longitudinal line of R. Similarly, a high frequency range evaluation value is calculated for the pixels (Gr00, Gr10, Gb20, . . . , Grj0) for one longitudinal line of Gr, a high frequency range evaluation value is calculated for the pixels (Gb00, Gb10, Gb20, . . . , Gbj0) for one longitudinal line of Gb, and a high frequency range evaluation value is calculated for the pixels (B00, B10, B20, . . . , Bj0) for one longitudinal line of B. Further, high frequency range evaluation values are calculated in a similar manner for all the lines up to R0$k$ to Rj$k$, Gr0$k$ to Grj$k$, Gb0$k$ to Gbj$k$, and B0$k$ to Bj$k$.

After the high frequency range evaluation values are thus calculated for all the lateral and longitudinal lines, all of lateral and longitudinal (j+k) high frequency range evaluation values are added up for R. Similarly, all of lateral and longitudinal (j+k) high frequency range evaluation values are added up for each of Gr, Gb and B. G includes Gr and Gb, so that the sum value of Gr and the sum value of Gb are added, and the added value is reduced by half. The sum value of each of R, G, and B thus obtained is determined as the high frequency range evaluation value for the divided region 26.

As described above, high frequency range evaluation values are respectively calculated for R, G, and B of each of the divided regions 26.

A subject distance estimation unit 36 estimates a subject distance for each of the divided regions 26 on the basis of the high frequency range evaluation value for each of R, G, and B obtained by the high spatial frequency range component evaluation unit 34. The operation of the subject distance estimation unit 36 is described in detail below.

Figure 4:
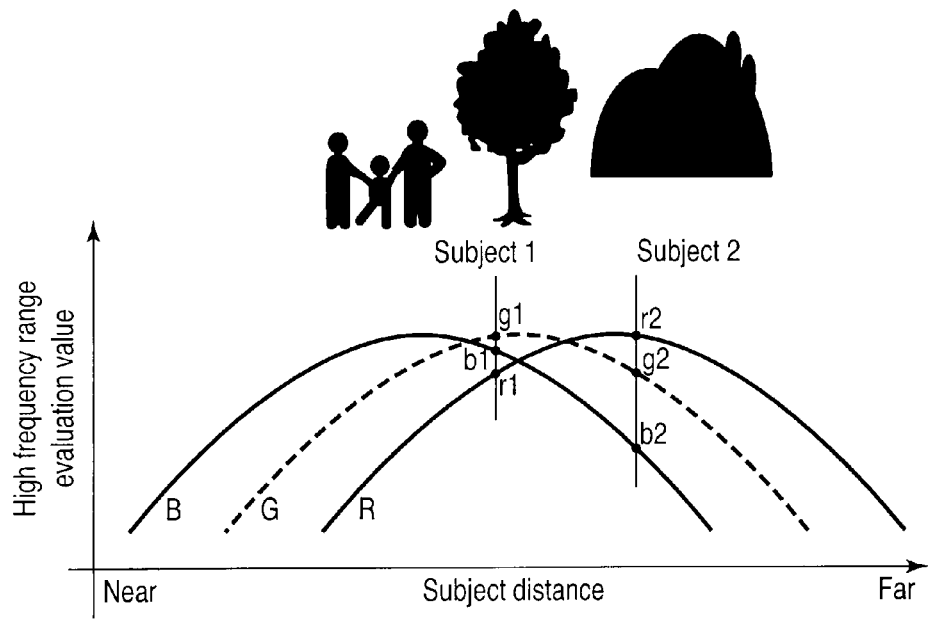
FIG. 4 is a graph showing the relation between a subject distance and a high frequency range evaluation value according to the embodiment.

As has already been described, the optical system 10 comprises a high dispersion lens, and changes its focal distance in accordance with the wavelength of light. That is, focal distances for R light, G light, and B light are different. Therefore, the relation between the subject distance and the high frequency range evaluation value is different for R light, G light, and B light. FIG. 4 is a graph showing the relation between the subject distance and the high frequency range evaluation value for each of R, G, and B. As shown in FIG. 4, even at the same subject distance, the high frequency range evaluation values for R, G, and B are different. Thus, the relation shown in FIG. 4 is set in a reference table in advance. Specifically, the relation between the ratio (r:g:b) of the high frequency range evaluation values for R, G, and B and the subject distance is set in the reference table in advance, wherein the high frequency range evaluation values for R, G, and B are r, g, and b, respectively. When such a reference table is prepared, the subject distance can be found from the high frequency range evaluation value obtained by the high spatial frequency range component evaluation unit 34. For example, the ratio (r:g:b) of the high frequency range evaluation values for R, G, and B is found from the high frequency range evaluation values obtained by the high spatial frequency range component evaluation unit 34, and a subject distance corresponding to a ratio closest to the ratio set in the reference table is found by a least squares method. Thus, a subject distance is found for each of the divided regions 26.

A filter operation unit 38 performs a filter operation (spatial frequency filter operation) on the high spatial frequency range component for each of the divided regions 26. Specifically, a convolution matrix operation is performed to blur an original image by low pass filter (LPF) processing or to carry out high spatial frequency range enhancing processing for reducing the blur in the original image by high pass filter (HPF) processing.

A flaw correction/noise reduction unit 40 is also connected to the filter operation unit 38, so that the result of flaw correction processing or noise reduction processing for the image pickup device 20 is input to the filter operation unit 38.

Filter coefficients used in the filter operation unit 38 are stored in a filter coefficient table 42.

The filter coefficient stored in the filter coefficient table 42 is selected by a filter coefficient selection unit (filter coefficient generating unit) 44. The filter coefficient selection unit (filter coefficient generating unit) 44 generates a filter coefficient for each of the divided regions 26 on the basis of the subject distance estimated by the subject distance estimation unit 36. That is, the filter coefficient selection unit 44 selects a filter coefficient for use in the filter operation unit 38 from the filter coefficient table 42. Specifically, the filter coefficient selection unit 44 selects a filter coefficient for each of the divided regions 26 to blur subjects other than a desired subject captured from the result of the previous autofocus processing. The degree of blurring can be adjusted under instructions from a controller 46. Moreover, the G color having an intermediate wavelength is used to focus on the subject. However, as the manner of blurring for the G color is different from the R color and the B color due to color aberration, the filter coefficient is corrected and adjusted so that the blurred impression for the R color and the B color may be the same as that for the G color. The amount of this adjustment can be uniquely calculated from the estimated distance and the color aberration of the lens.

In addition, as there is a possibility of an erroneous detection of the subject distance, a filter coefficient may be selected in the following manner to prevent unnatural blurred impression. That is, after estimated distances are calculated for all of the divided regions 26, the continuity of the filter coefficients between the adjacent divided regions 26 is checked. Smoothing is then performed to prevent a rapid change in the filter coefficient. As a result, natural blurred impression can be produced.

When a luminance difference, a hue difference, and a chroma difference between the adjacent divided regions 26 are all within a predetermined range, the subjects may be judged to be identical, and the same filter coefficient may be generated for these divided regions 26. Such a method also enables natural blurred impression to be produced.

Figure 5:
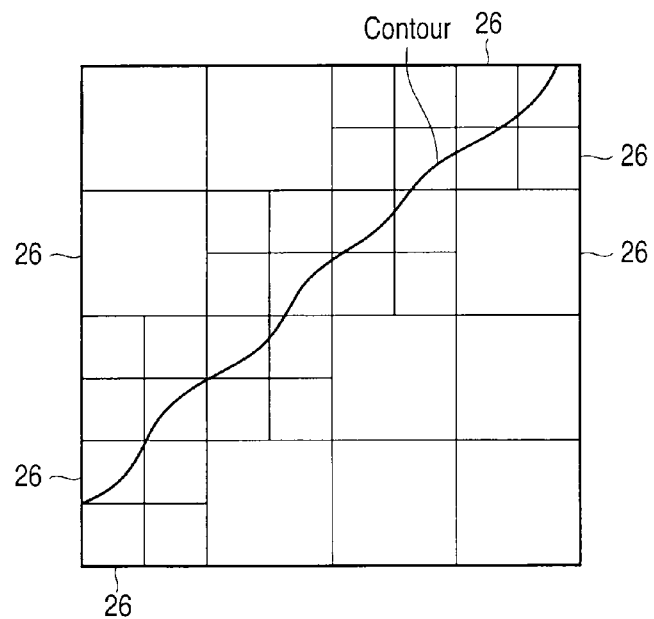
FIG. 5 is a diagram showing the divided regions in the vicinity of the contour of a subject according to the embodiment.

After the contour of the subject is extracted by a predetermined method, the sizes of the divided regions 26 may be reduced in the vicinity of the contour of the subject as shown in FIG. 5. As a result, the contour can be clearly shown.

A main processor 48 subjects the image data after the filter operation to various kinds of operation processing such as a color mixing correction, a white balance, an RGB matrix, a gamma correction and a YUV transformation matrix. The color mixing correction is intended to correct, by an operation, signals that are not easily separated due to light interference or signal interference caused between adjacent pixels. The white balance is intended to correct the inclination of color shades attributed to the color temperature of an illumination light source. The RGB matrix is intended to adjust the color gamut of the image in accordance with an output format. The gamma correction is intended to adjust a luminance tone curve to a prescribed curve of the output format. The YUV transformation matrix is intended to output a color difference signal from an RGB signal.

Consequently, final image data in which the subjects other than the desired subject are blurred is output from the main processor 48.

As described above, according to the embodiment, an optical system having color aberration to change its focal distance in accordance with the wavelength of light is used as the optical system 10, and the high spatial frequency range component evaluation unit 34 evaluates a high spatial frequency range component of each of the basic colors (R, G and B) in each of the divided regions 26. The subject distance estimation unit 36 then estimates a subject distance for each of the divided regions 26 on the basis of the evaluated high spatial frequency range component. Further, a filter coefficient is generated for each of the divided regions 26 on the basis of the estimated subject distance, and the generated filter coefficient is used to perform a filter operation on the high spatial frequency range component. As a result, it is possible to easily blur the subjects other than the desired subject, and photography with a small depth of field can be performed.

The signal processing device and the imaging device described above are applicable to both a fixed focus type and a variable focus type. That is, processing may be started with a fixed focus state, or may be started with an autofocus-adjusted state. However, the devices according to the embodiment described above are particularly advantageous to the fixed focus type. That is, the disadvantage of conventional technique is that processing time is increased because subject distance information is not obtained without a focus scan. According to the embodiment described above, subject distance information is obtained simply by preliminary photography for one frame without the focus scan, so that processing time is reduced.

Although three basic colors R, G and B are used according to the embodiment described above, four or more basic colors may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing device comprising:

a high spatial frequency range component evaluation unit configured to evaluate a high spatial frequency range component of each of basic colors for each of divided regions for an image picked up by an image pickup device, the divided regions being obtained by dividing an imaging surface of the image pickup device into a plurality of regions;

a subject distance estimation unit configured to estimate a subject distance for each of the divided regions on the basis of the high spatial frequency range component evaluated by the high spatial frequency range component evaluation unit;

a filter coefficient generating unit configured to generate a filter coefficient for each of the divided regions on the basis of the subject distance estimated by the subject distance estimation unit; and a filter operation unit configured to perform a filter operation on the high spatial frequency range component by use of the filter coefficient generated by the filter coefficient generating unit;

wherein the filter coefficient generating unit is configured to generate the same filter coefficient for adjacent divided regions when a luminance difference, a hue difference, and a chroma difference between the adjacent divided regions are all within respective predetermined ranges.

2. The device according to claim 1, wherein the high spatial frequency range component evaluation unit is configured to evaluate a ratio of the high spatial frequency range components of the basic colors for each of the divided regions.

3. The device according to claim 1, wherein the subject distance estimation unit is configured to estimate the subject distance on the basis of a prepared relation between the high spatial frequency range components of the basic colors and the subject distance.

4. The device according to claim 3, wherein the prepared relation comprises a relation between the ratio of the high spatial frequency range components and the subject distance.

5. The device according to claim 3, wherein the prepared relation is set in a reference table in advance.

6. The device according to claim 1, wherein the filter coefficient generating unit is configured to generate the filter coefficient to blur subjects other than a desired subject.

7. The device according to claim 1, wherein a size of the divided region in the vicinity of a contour of the subject is smaller than sizes of the other divided regions.

8. The device according to claim 1, wherein the divided regions are longitudinally and laterally arranged.

9. The device according to claim 1, wherein the basic colors comprise red, green, and blue.

10. An imaging device comprising:

an optical system configured to change its focal distance in accordance with a wavelength of light;

an image pickup device having an imaging surface on which an image through the optical system is formed;

a high spatial frequency range component evaluation unit configured to evaluate a high spatial frequency range component of each of basic colors for each of divided regions for the image picked up by the image pickup device, the divided regions being obtained by dividing the imaging surface of the image pickup device into a plurality of regions;

a subject distance estimation unit configured to estimate a subject distance for each of the divided regions on the basis of the high spatial frequency range component evaluated by the high spatial frequency range component evaluation unit;

a filter coefficient generating unit configured to generate a filter coefficient for each of the divided regions on the basis of the subject distance estimated by the subject distance estimation unit; and a filter operation unit configured to perform a filter operation on the high spatial frequency range component by use of the filter coefficient generated by the filter coefficient generating unit, wherein the filter coefficient generating unit is configured to generate the same filter coefficient for adjacent divided regions when a luminance difference, a hue difference, and a chroma difference between the adjacent divided regions are all within respective predetermined ranges.

11. The device according to claim 10, wherein the optical system includes a high dispersion lens.

12. The device according to claim 10, wherein the high spatial frequency range component evaluation unit is configured to evaluate a ratio of the high spatial frequency range components of the basic colors for each of the divided regions.

13. The device according to claim 10, wherein the subject distance estimation unit is configured to estimate the subject distance on the basis of a prepared relation between the high spatial frequency range components of the basic colors and the subject distance.

14. The device according to claim 13, wherein the prepared relation comprises a relation between the ratio of the high spatial frequency range components and the subject distance.

15. The device according to claim 13, wherein the prepared relation is set in a reference table in advance.

16. The device according to claim 10, wherein the filter coefficient generating unit is configured to generate the filter coefficient to blur subjects other than a desired subject.

17. The device according to claim 10, wherein a size of the divided region in the vicinity of a contour of the subject is smaller than sizes of the other divided regions.

18. The device according to claim 10, wherein the divided regions are longitudinally and laterally arranged.

19. The device according to claim 10, wherein the basic colors comprise red, green, and blue.

* * * * *